United States Patent
Murakami

(10) Patent No.: US 9,743,371 B2
(45) Date of Patent: Aug. 22, 2017

(54) CONTROL APPARATUS, COMMUNICATION SYSTEM, SYNCHRONIZATION METHOD AND PROGRAM

(71) Applicant: NEC Corporation, Minato-ku, Tokyo (JP)

(72) Inventor: Takahiko Murakami, Tokyo (JP)

(73) Assignee: NEC CORPORATION, Tokyo (JP)

(*) Notice: Subject to any disclaimer, the term of this patent is extended or adjusted under 35 U.S.C. 154(b) by 167 days.

(21) Appl. No.: 14/773,464

(22) PCT Filed: Mar. 11, 2014

(86) PCT No.: PCT/JP2014/056258
§ 371 (c)(1),
(2) Date: Sep. 8, 2015

(87) PCT Pub. No.: WO2014/142095
PCT Pub. Date: Sep. 18, 2014

(65) Prior Publication Data
US 2016/0021634 A1    Jan. 21, 2016

(30) Foreign Application Priority Data
Mar. 12, 2013 (JP) .................. 2013-049169

(51) Int. Cl.
*H04J 3/06* (2006.01)
*H04W 56/00* (2009.01)
(Continued)

(52) U.S. Cl.
CPC ....... *H04W 56/0015* (2013.01); *H04L 1/1678* (2013.01); *H04Q 3/54* (2013.01)

(58) Field of Classification Search
CPC .......... H04W 56/0015; H04L 1/1678
See application file for complete search history.

(56) References Cited

U.S. PATENT DOCUMENTS

2009/0059849 A1* 3/2009 Namba ............. H04L 1/1825
370/328
2009/0245124 A1* 10/2009 Ichikawa ........... H04L 43/106
370/252

FOREIGN PATENT DOCUMENTS

JP    2006108774 A    4/2006
JP    2010518756 A    5/2010
(Continued)

OTHER PUBLICATIONS

Nick McKeown, et. al. "OpenFlow: Enabling Innovation in Campus Networks" Mar. 14, 2008.
(Continued)

*Primary Examiner* — Shaq Taha

(57) ABSTRACT

A control apparatus comprises: a synchronization unit that transmits control information set in a communication node to another control apparatus that operates in synchronization with the control apparatus and synchronizes with the another control apparatus; and a control information creation unit that creates control information to be set in a communication node to be controlled. If the created control information is first control information set temporarily in accordance with a notification from the communication node to be controlled, the control apparatus sets the first control information in the communication node without waiting to synchronize with the another control apparatus. If control information to be set is second control information other than the first control information, the control apparatus sets the second control information in the communication node after synchronizing with the another control apparatus.

18 Claims, 11 Drawing Sheets

(51) Int. Cl.
  *H04Q 3/54* (2006.01)
  *H04L 1/16* (2006.01)

(56) References Cited

FOREIGN PATENT DOCUMENTS

| | | |
|---|---|---|
| JP | 2012195807 A | 10/2012 |
| WO | 2012098786 A1 | 7/2012 |
| WO | 2012111051 A1 | 8/2012 |

OTHER PUBLICATIONS

Open Networking Foundation, "OpenFlow Switch Specification, Version 1.3.1 (Wire Protocol 0x04)" Sep. 6, 2012.
International Search Report for PCT Application No. PCT/JP2014/056258, mailed on May 27, 2014.

\* cited by examiner

_US 9,743,371 B2_

CONTROL APPARATUS, COMMUNICATION SYSTEM, SYNCHRONIZATION METHOD AND PROGRAM

REFERENCE TO RELATED APPLICATION

The present application is a National Stage Entry of PCT/JP2014/056258 filed Mar. 11, 2014, which is based on and claims the benefit of the priority of Japanese Patent Application No. 2013-049169, filed on Mar. 12, 2013, the disclosures of all of which are incorporated herein in their entirety by reference. The present invention relates to a control apparatus, communication system, synchronization method and program, and particularly to a control apparatus, communication system, synchronization method and program that sets control information in a communication node.

TECHNICAL FIELD

Background

In recent years, a technology called OpenFlow has been proposed (refer to Non-Patent Literatures 1 and 2). OpenFlow treats communication as an end-to-end flow and performs path control, failure recovery, load balancing, and optimization for each flow. An OpenFlow switch, specified in Non-Patent Literature 2, comprises a secure channel for communicating with an OpenFlow controller and operates according to a flow table, an addition to or rewriting of which is suitably instructed by the OpenFlow controller. In the flow table, a set of matching rules (Match Fields) to be matched against a packet header, flow statistics (Counters), and Instructions defining the processing contents is defined for each flow (refer to the section of "5.2 Flow Table" in Non-Patent Literature 2).

For instance, upon receiving a packet, the OpenFlow switch searches for an entry having a matching rule (refer to "5.3 Matching" in Non-Patent Literature 2) that matches the header information of the received packet in the flow table. When an entry matching the received packet is found as a result of the search, the OpenFlow switch updates the flow statistics (Counters) and performs the processing contents (packet transmission from a designated port, flooding, discard, etc.) written in the instruction field of the entry on the received packet. On the other hand, when no entry matching the received packet is found as a result of the search, the OpenFlow switch transmits a packet reception notification (Packet-In message) via the secure channel. The OpenFlow switch receives a flow entry that defines the processing contents and updates the flow table. As described, the OpenFlow switch forwards a packet using an entry stored in the flow table as control information.

Patent Literature 1 discloses a communication system and method that includes a step of receiving a first request for starting a quality of service (QoS) flow guaranteed in a network, broadcasting a second request from a network coordinator to a plurality of nodes connected to the network, and receiving a first response to the second request from at least one entry node.

Patent Literature 2 discloses a transport packet output device that outputs a transport packet sequence associated with time stamp information indicating an acquired timing.
Patent Literature 1:
Japanese Patent Kohyo Publication No. JP-P2010-518756A
Patent Literature 2:
Japanese Patent Kokai Publication No. JP-P2006-108774A Non-Patent Literature 1:
Nick McKeown, et. al. "OpenFlow: Enabling Innovation in Campus Networks," [online], [searched on Feb. 18, 2013], the Internet <URL: http://www.openflow.org/documents/openflow-wp-latest.pdf>.
Non-Patent Literature 2:
"OpenFlow Switch Specification, Version 1.3.1 (Wire Protocol 0x04)," [online], [searched on Feb. 18, 2013], the Internet <URL: https://www.opennetworking.org/images/stories/downloads/specificatio n/openflow-spec-v1.3.1.pdf>.

SUMMARY

The following analysis is given by the present invention. In a centralized-control network represented by OpenFlow described above, it is preferred that redundant control apparatuses (controllers) be provided since the control apparatus (controller) is not able to set a new flow or follow topology changes when a failure occurs therein.

In such a configuration in which a plurality of control apparatuses (controllers) are provided, an active control apparatus (controller) must notify the contents of an instruction for a communication node (switch) to a standby control apparatus (controller) so that the controllers are synchronized. When this synchronization is strictly performed like the three-phase commit protocol in databases, the synchronization cost increases greatly and the synchronization takes time, for instance, if a large amount of control information (flow entry) is generated in a short period of time, delaying the setting of the communication nodes (switches).

On the other hand, there is a method in which the active control apparatus (controller) simply notifies the standby control apparatus (controller) of the instruction contents for the communication node (switch) without performing strict synchronization. In this case, depending on the timing, there may be a situation in which the instruction contents are notified to the standby control apparatus (controller), but not to the communication node (switch). Conversely, there may be a situation in which the instruction contents are reflected in the communication node (switch), but they are not notified to the standby control apparatus (controller). Particularly, if the instruction contents are not notified to the standby control apparatus (controller), it will be difficult to identify the control information (flow entry) having unmatched states during the processing for matching the states of the control apparatuses (controllers) when the system is switched.

Therefore, there is a need in the art to provide a control apparatus, communication system, synchronization method and program capable of contributing to streamlining a process for synchronizing redundant control apparatuses in the centralized-control network.

According to a first aspect, there is provided a control apparatus, comprising: a synchronization unit that transmits control information set in a communication node to another control apparatus that operates in synchronization with the control apparatus and synchronizes with the another control apparatus; and a control information creation unit that creates control information to be set in a communication node to be controlled. If the created control information is first control information set temporarily in accordance with a notification from the communication node to be controlled, the control apparatus sets the first control information in the communication node without waiting to synchronize with the another control apparatus. If control information to be set is second control information other than the first control information, the control apparatus sets the second control information in the communication node after synchronizing with the another control apparatus.

According to a second aspect, there is provided a communication system comprising: the control apparatus described above; and a communication node that processes a received packet based on the set control information.

According to a third aspect, there is provided a synchronization method, comprising: by a control apparatus, transmitting control information set in a communication node to another control apparatus that operates in synchronization with the control apparatus and synchronizing with the another control apparatus; creating control information to be set in a communication node to be controlled; if the created control information is first control information set temporarily in accordance with a notification from the communication node to be controlled, setting the first control information in the communication node without waiting to synchronize with the another control apparatus; and if control information to be set is second control information other than the first control information, setting the second control information in the communication node after synchronizing with the another control apparatus. The present method is tied to a particular machine, which is a control apparatus of a centralized-control network.

According to a fourth aspect, there is provided a program causing a computer provided in a control apparatus to execute: transmitting control information set in a communication node to another control apparatus that operates in synchronization with the control apparatus and synchronizing with the another control apparatus; creating control information to be set in a communication node to be controlled; if the created control information is first control information set temporarily in accordance with a notification from the communication node to be controlled, setting the first control information in the communication node without waiting to synchronize with the another control apparatus; and if control information to be set is second control information other than the first control information, setting the second control information in the communication node after synchronizing with the another control apparatus. Further, this program can be stored in a computer-readable (non-transient) storage medium. In other words, the present invention can be realized as a computer program product.

The present invention provides the following advantage, but not restricted thereto. According to the present invention, it becomes possible to contribute to streamlining a process for synchronizing redundant control apparatuses in a centralized-control network.

PREFERRED MODES

Figure 1:
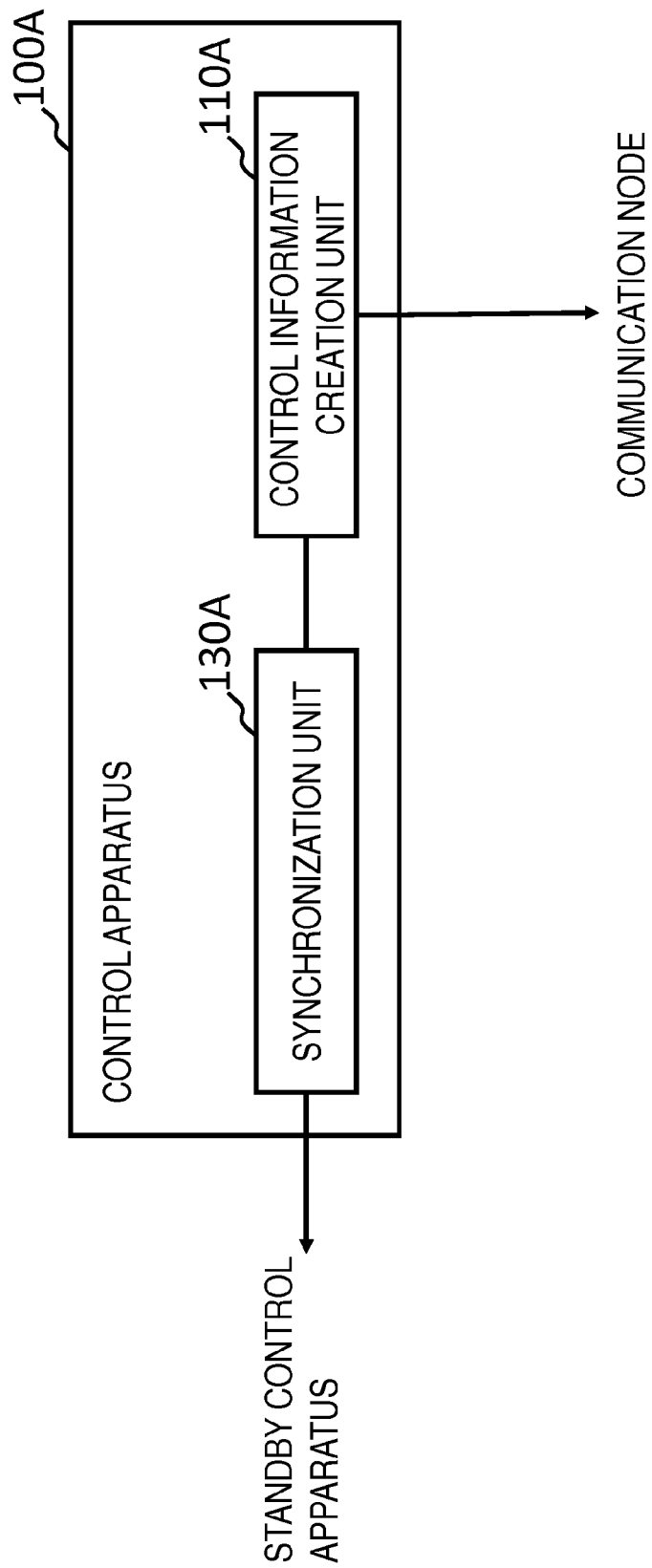
FIG. 1 is a drawing showing the configuration of an exemplary embodiment of the present invention.

In the present disclosure, there are various possible modes, which include the following, but not restricted thereto. First, a summary of an exemplary embodiment will be given with reference to the drawings. Note that drawing reference signs in the summary are given to each element as an example solely to facilitate understanding for convenience, and are not intended to limit the present invention to the modes shown in the drawings.

As shown in FIG. 1, the present invention can be realized in an exemplary embodiment thereof by a control apparatus 100A that comprises a synchronization unit 130A that transmits control information set in a communication node to a second control apparatus (standby control apparatus in FIG. 1) that operates in synchronization thereby synchronizing the control apparatus with the second control apparatus, and a control information creation unit 110A that creates control information set in a communication node to be controlled.

More concretely, if the control information created by the control information creation unit 110A is first control information set temporarily in accordance with a notification from the communication node to be controlled, the control apparatus 100A sets the first control information in the communication node without waiting to be synchronized with the second control apparatus. If the control information created by the control information creation unit 110A is second control information that is not the first control information, the control apparatus 100A sets the second control information in the communication node after being synchronized with the second control apparatus.

In this configuration, the set time can be reduced since a flow can be set without waiting for synchronization to be completed for the first control information set temporarily in accordance with a notification from the communication node. Meanwhile, the second control information that is not the first control information is set at a particular timing such as the launch of a network or a configuration change. As a result, even if strict synchronization is performed, the impact on the service to the user is small. Further, by switching the synchronization processing, control information (the second control information) set semi-permanently at the launch of a network or a configuration change can be synchronized reliably. On the other hand, the first control information set temporarily in accordance with a notification from the communication node may not reliably synchronized sometimes, but the communication node can send a notification each time the first control information is failed to be set and the impact on the entire system is minor.

First Exemplary Embodiment

Next, a first exemplary embodiment in which the present invention is applied to an OpenFlow network will be described in detail with reference to the drawings. First, terms used in the description below will be explained. Control information (flow entry) created at the reception of a packet reception notification message (the Packet-in message in Non-Patent Literature 2) from an OpenFlow switch (referred to as "switch" hereinafter) is referred to as "temporary flow entry" (the first control information). Meanwhile, control information (flow entry) created at timings such as a network configuration change and semi-permanently set in a switch unless the configuration changes is referred to as "permanent flow entry" (the second control information).

The temporary flow entry and the permanent entry can also be explained as follows.

Temporary Flow Entry:

Flow entry having a function of sorting into an appropriate permanent flow entry.

Flow entry for which an idle timeout (timeout based on the last used time) is set and that disappears when there is no communication.

It is created each time communication occurs and the number of entries is greater than that of the permanent flow entries. When a large amount of communication occurs in a short period of time, a large number of entries may be created at once.

Flow entry that can be recovered by having a switch detect that there is no corresponding entry and send a Packet-in message again even when the setting of the switch fails.

Even when synchronization with a standby control apparatus (controller) fails, there is no problem as long as this control apparatus (controller) operates as a standby. Further, even when the control apparatus (controller) switches to an active one, there is no problem as long as the entry in the switch has been deleted due to a timeout.

Permanent Flow Entry:

Flow entry set for steady forwarding between particular switches. It is also used to configure a link aggregation in which a plurality of links among switches are aggregated.

Flow entry created and deleted according to a topology change among switches. As a general rule, no change is made for any other reasons and no timeout is set.

It is requested that the setting state of the flow entry recognized by the controller match the setting state of the flow entry actually set in a switch.

It is not dependent on the amount of communication, and the number of entries is less than that of the temporary flow entries.

Figure 2:
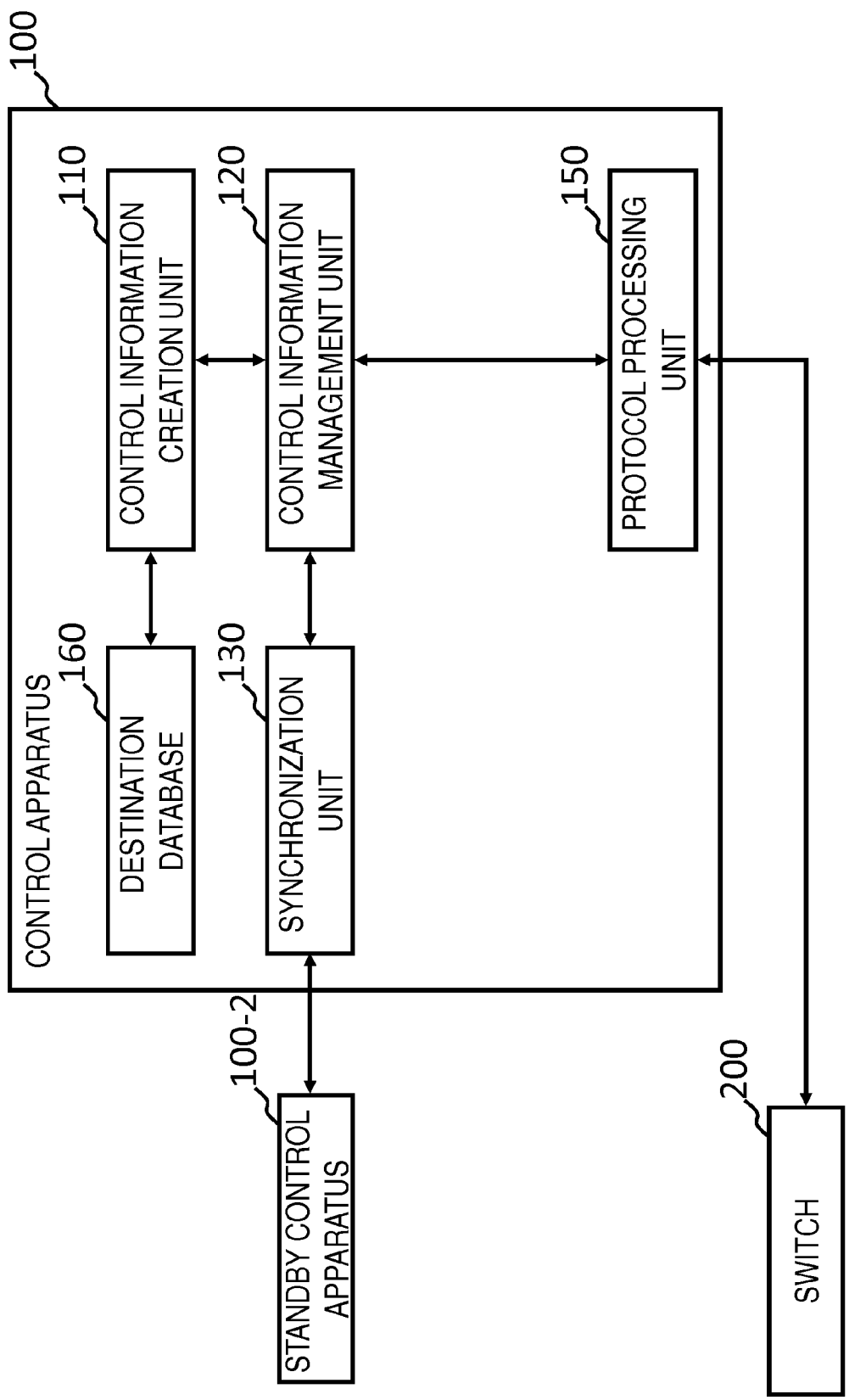
FIG. 2 is a drawing showing the configuration of a control apparatus of a first exemplary embodiment of the present invention.

FIG. 2 is a drawing showing the configuration of a control apparatus 100 of a first exemplary embodiment of the present invention that sets the temporary flow entry and the permanent flow entry in a switch. FIG. 2 shows the control apparatus 100 that comprises a control information creation unit 110, a control information management unit 120, a synchronization unit 130, a protocol processing unit 150, and a destination database 160.

The control information creation unit 110 communicates with a switch 200 via the protocol processing unit 150 and creates control information (flow entry) required for the communication.

Further, the control information creation unit 110 has the following functions (1-1) to (2-2).

(1-1) It discovers the topology by instructing a connected switch to send a packet for discovering the topology (for instance LLDP (Link Layer Discovery Protocol) packet) and receiving a Packet-in message from an opposing switch connected to the switch. Further, when the control information creation unit 110 does not hold the topology and the control apparatus 100 comprises a topology database for storing the discovered topology, this database may be utilized.

(1-2) It creates a necessary permanent flow entry on the basis of the topology discovery results. Further, it determines whether or not the permanent flow entry needs to be changed or deleted as necessary.

(2-1) It detects a terminal that sends communication from a port connected outside the network on the basis of a Packet-in message received from an edge switch and registers the terminal location information thereof in the destination database 160

(2-2) For a Packet-in message received from an edge switch, it searches the destination database 160, identifies a switch connected to a destination terminal or server and a port thereof, and creates a temporary flow entry on the entrance side for linking to the permanent flow entry already set in (1-2) and a temporary flow entry to be set in a switch on the exit side carried by the permanent flow entry already set in (1-2).

When creating a permanent flow entry, the control information creation unit 110 first transmits the permanent flow entry to the control information management unit 120, wait for synchronization, and then sets it in the switch 200. When creating a temporary flow entry, the control information creation unit 110 first sets it in the switch 200, and then transmits it to the control information management unit 120.

Upon receiving the permanent flow entry or temporary flow entry from the control information creation unit 110, the control information management unit 120 stores in a corresponding queue of the synchronization unit 130 and issues a synchronization request.

The synchronization unit 130 manages the setting of the permanent flow entry or temporary flow entry in separate queues, preferentially transmits the permanent flow entry to a standby control apparatus 100-2, and performs a synchronization process. When there is no permanent flow entry in the queue, the synchronization unit 130 synchronizes the temporary flow entry. Further, since a process of waiting for the completion of synchronization is performed for the permanent flow entry, the synchronization unit 130 has a function of notifying the component (the control information management unit 120) that requested the synchronization of the completion of the synchronization when the synchronization is completed.

The protocol processing unit 150 exchanges control messages with the switch 200 using the OpenFlow protocol in Non-Patent Literature 2. For instance, when receiving a request to set control information (flow entry) from the control information management unit 120, the protocol processing unit 150 instructs the switch 200 to add, update, and delete control information (flow entry) by transmitting control messages such as Modify Flow Entry message (Add), Modify Flow Entry message (Modify), and Modify Flow Entry message (Delete) in Non-Patent Literature 2.

The destination database 160 holds information of a terminal connected to a port of the switch 200 and of an external network.

Further, each unit (processing means) of the control apparatus 100 shown in FIG. 2 can be realized by a computer program that has a computer constituting the control apparatus 100 execute each processing described above using the hardware thereof.

Next, the operation of the present exemplary embodiment will be described in detail with reference to the drawings. First, how the control apparatus 100 sets a permanent flow entry will be described.

The Setting of a Permanent Flow Entry

Figure 3:
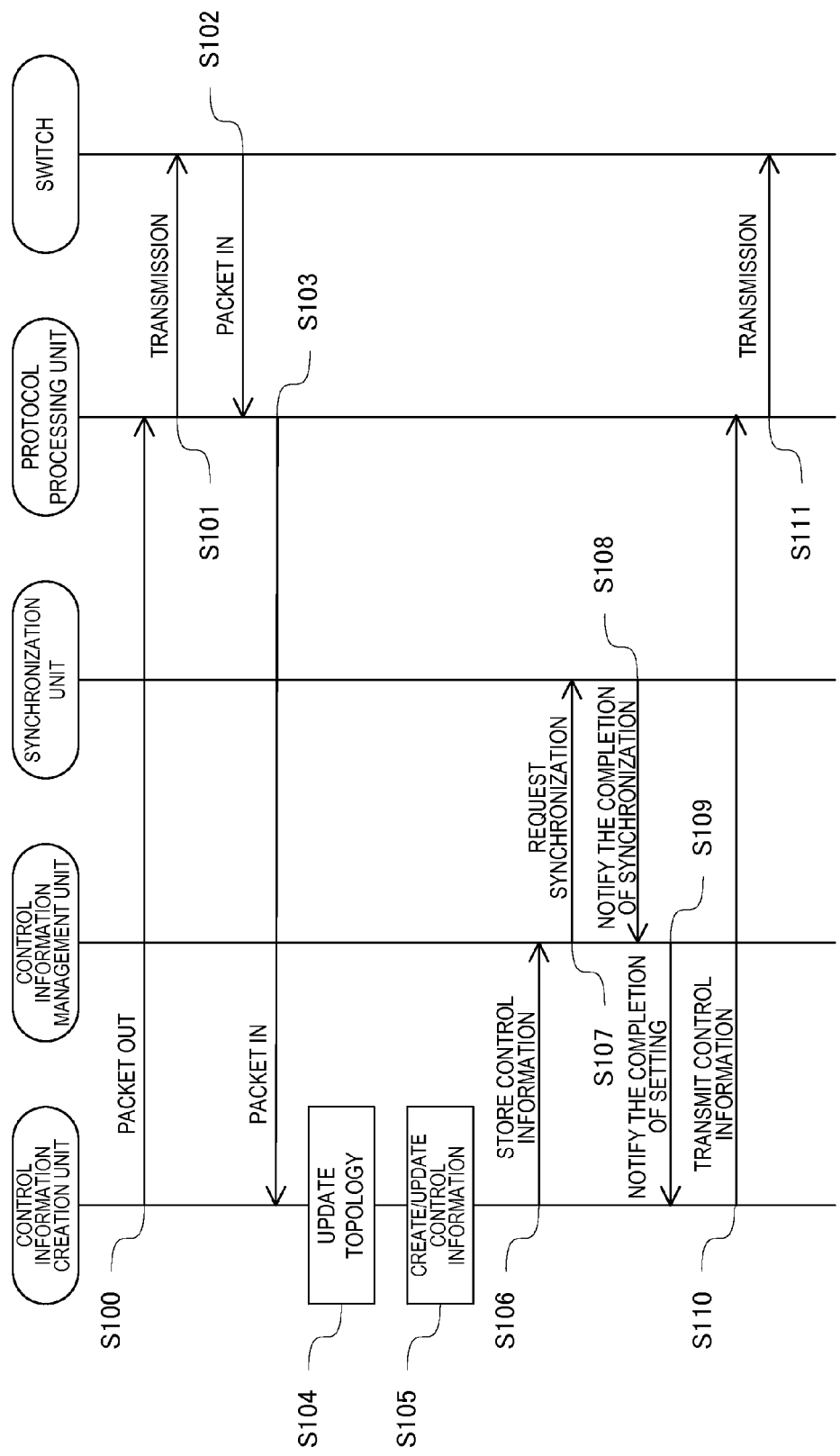
FIG. 3 is a sequence diagram showing an operation (when a switch is connected) of the control apparatus of the first exemplary embodiment of the present invention.

FIG. 3 is a sequence diagram showing the operation of the control apparatus triggered by a topology change such as a switch connection. In FIG. 3, the control apparatus 100 instructs a switch 200 to send a packet for detecting the topology (such as an LLDP packet) to detect any topology change when a predetermined timing arrives (steps S100 and S101).

Then, by receiving a Packet-In message from another switch 200 that has received the packet for detecting the topology, the control apparatus 100 determines whether or not a change has occurred in the topology (steps S102 and S103). Here, it is assumed that a new switch 200 has been connected to the network and a change has occurred in the topology.

Having received the Packet-in message, the control apparatus 100 updates topology information held by the control information creation unit 110 or by a topology database separately provided (step S104).

Next, the control apparatus 100 creates a permanent flow entry necessitated by the topology change, or determines how a permanent flow entry already set should be rewritten (step S105).

Next, the control apparatus 100 first transmits the changed contents (addition, change) of the permanent flow entry to the standby control apparatus 100-2 and requests synchronization (steps S106 and S107).

With a condition that a notification is received from the standby control apparatus 100-2 that the synchronization has been completed (steps S108 and S109), the control apparatus 100 instructs the switch 200 to add/update the permanent flow entry (steps S110 and S111).

Figure 4:
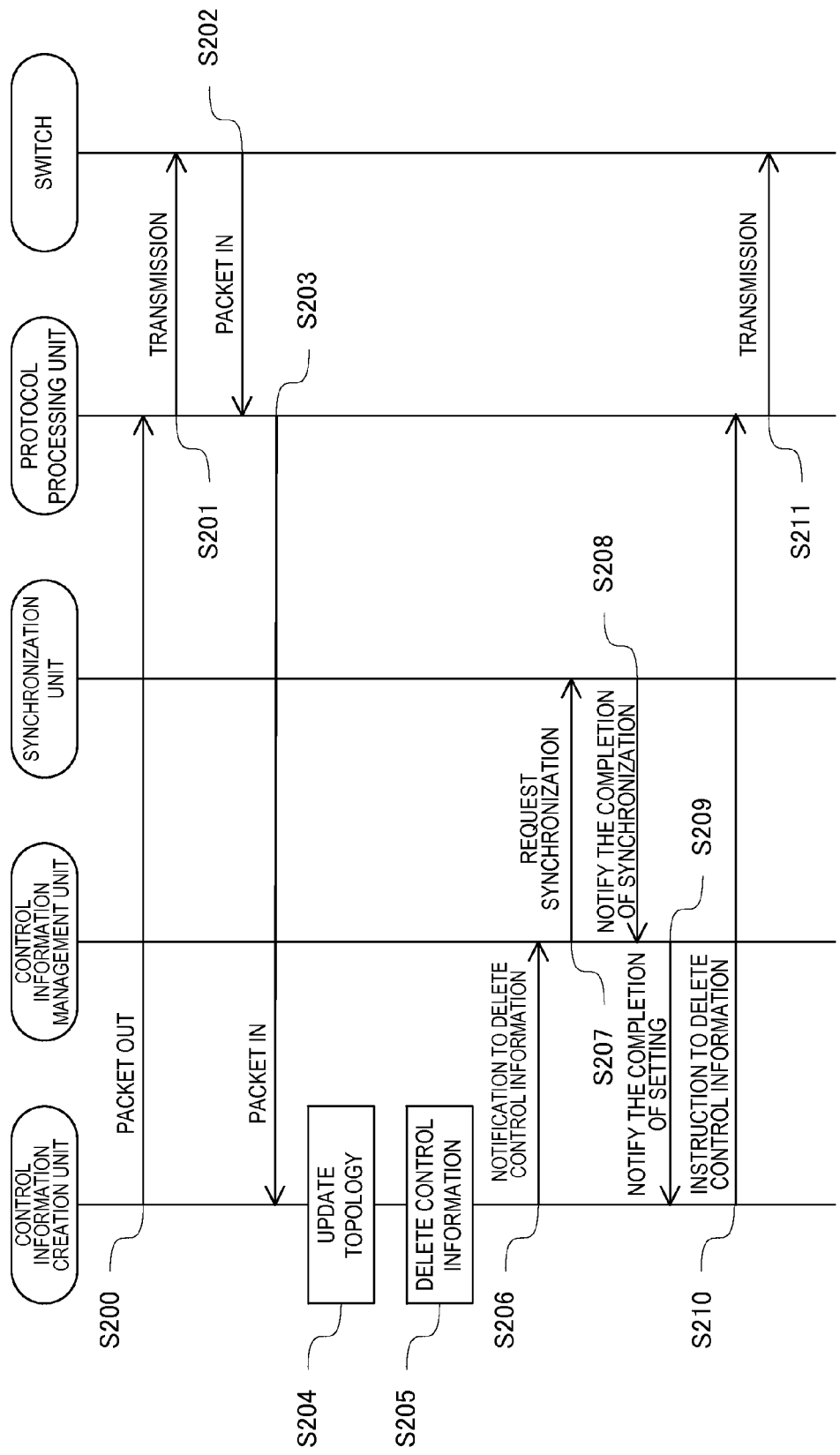
FIG. 4 is a sequence diagram showing an operation (when a switch is disconnected) of the control apparatus of the first exemplary embodiment of the present invention.

FIG. 4 is a sequence diagram showing the operation of the control apparatus triggered by a topology change such as a switch withdrawal. In FIG. 4, the control apparatus 100 instructs a switch 200 to send a packet for detecting the topology (such as an LLDP packet) to detect any topology change when a predetermined timing arrives as in FIG. 3 (steps S200 and S201).

Then, by receiving a Packet-In message from another switch 200 that has received the packet for detecting the topology, the control apparatus 100 determines whether or not a change has occurred in the topology (steps S202 and S203). Here, it is assumed that a switch 200 has withdrawn from the network and a change has occurred in the topology.

Having received the Packet-in message, the control apparatus 100 updates the topology information held by the control information creation unit 110 or by a topology database separately provided (step S204).

Next, the control apparatus 100 derives a permanent flow entry unnecessitated by the topology change, or determines how a permanent flow entry already set should be rewritten (step S205).

Next, the control apparatus 100 first notifies the standby control apparatus 100-2 of the permanent flow entry to be deleted and then requests synchronization (steps S206 and S207).

With a condition that a notification is received from the standby control apparatus 100-2 that the synchronization has been completed (steps S208 and S209), the control apparatus 100 instructs the switch 200 to delete the permanent flow entry (steps S210 and S211).

Next, how the control apparatus 100 sets a temporary flow entry will be described.

The Setting of a Temporary Flow Entry9

Figure 5:
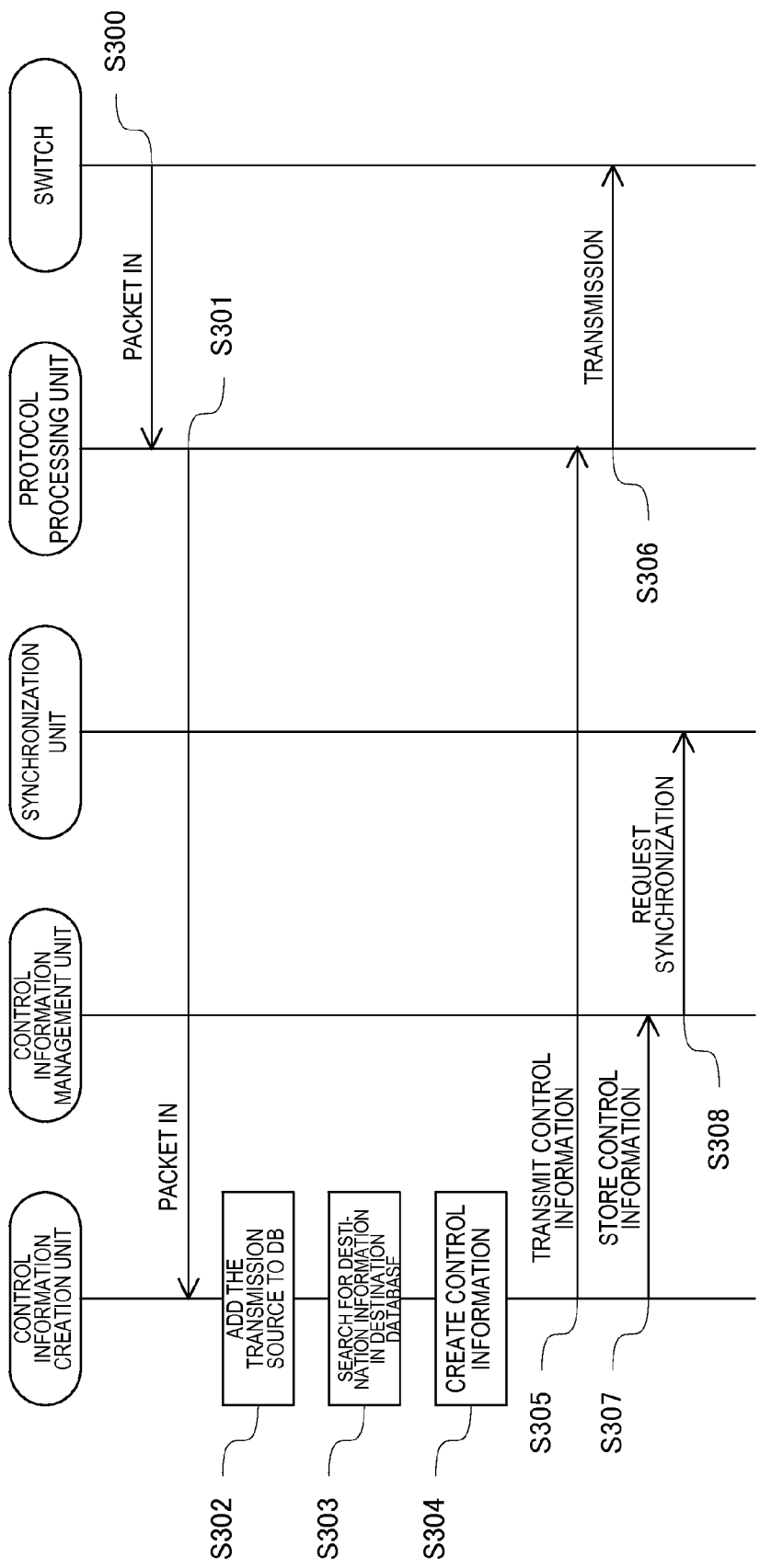
FIG. 5 is a sequence diagram showing an operation (the setting of first control information) of the control apparatus of the first exemplary embodiment of the present invention.

FIG. 5 is a sequence diagram showing the operation of the control apparatus triggered by the reception of a packet reception notification (Packet-in message) from a switch.

In FIG. 5, when receiving a new packet that does not match the matching rules of existing control information (flow entry), the switch 200 transmits a Packet-in message to the control apparatus 100 (steps S300 and S301).

Having received the Packet-in message, the control apparatus 100 stores the transmission source information of the packet in the destination database 160 (step S302). Further, the control apparatus 100 refers to the destination database 160 and identifies a switch connected to the destination device of the packet and a connection port thereof (step S303). Here, it is assumed that a packet has been received from the destination device of the packet and an entry corresponding to the destination is registered in the destination database 160.

Next, the control apparatus 100 creates a temporary flow entry to be set in entry and outlet switches of the network to determine forwarding source and destination switches (step S304).

Next, the control apparatus 100 instructs the switch 200 to add or change the temporary flow entry (steps S305 and S306).

Then, the control apparatus 100 transmits the temporary flow entry to the control information management unit 120 and requests synchronization with the standby control apparatus 100-2 (steps S307 and S308).

Further, the deletion of the temporary flow entry set as described above is triggered by an idle timeout. In this case, the switch 200 transmits a control information (flow entry) deletion notification. Upon receiving the control information (flow entry) deletion notification, the control apparatus 100 deletes the corresponding control information (flow entry) from the control information management unit 120 therein, and requests synchronization with the standby control apparatus 100-2 via the synchronization unit 130. Here, it is not necessary to strictly perform the temporary flow entry synchronization. If necessary, the switch 200 and the standby control apparatus 100-2 may set a hard timeout value in each entry so that the corresponding control information is deleted when a predetermined period of time has elapsed after it is set.

Next, a process of synchronizing a temporary flow entry when a request to delete a flow (communication termination notification) is received from a user of the network, instead of the switch 200, will be described.

Figure 6:
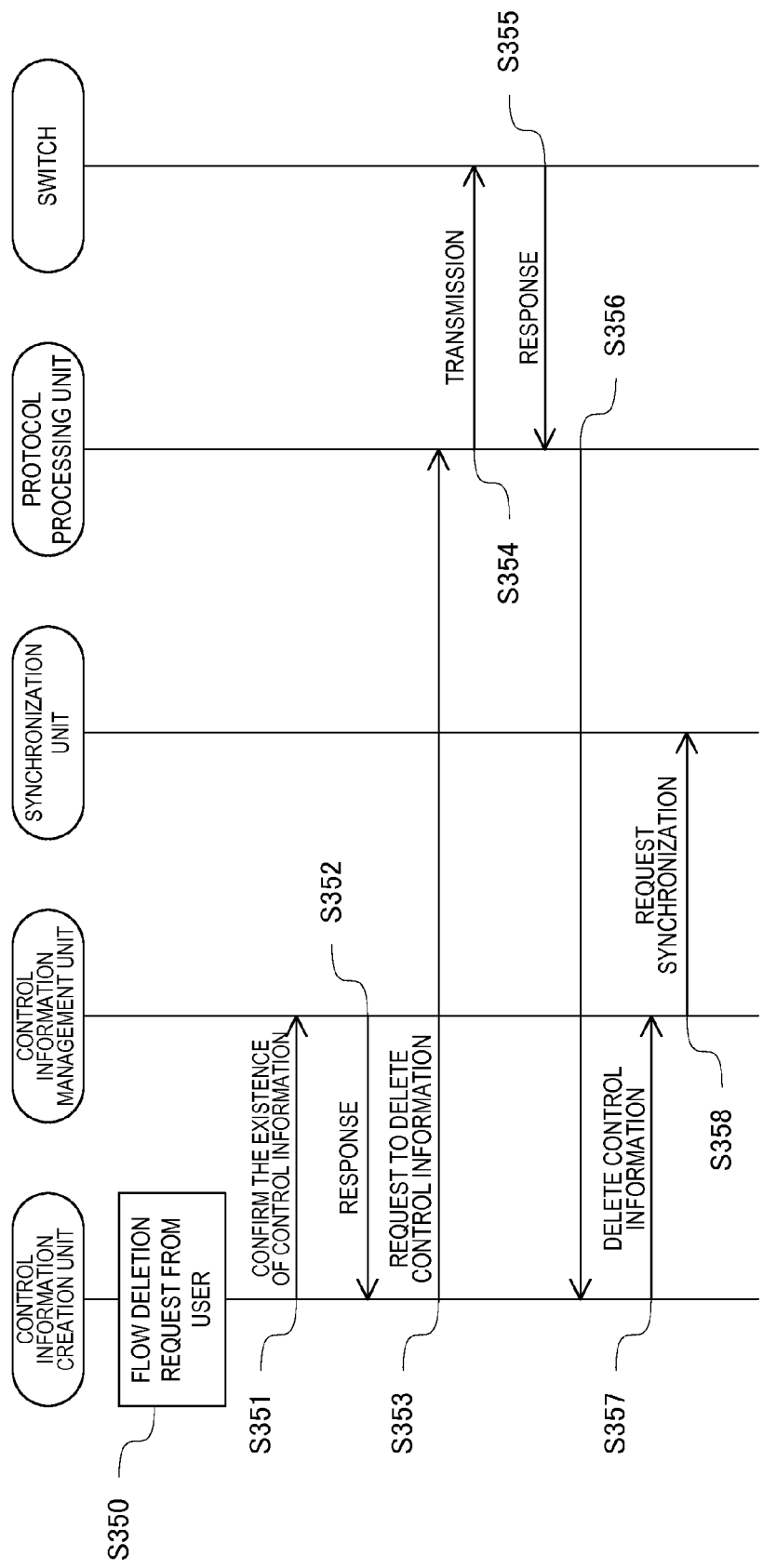
FIG. 6 is a sequence diagram showing an operation (the deletion of the first control information) of the control apparatus of the first exemplary embodiment of the present invention.

FIG. 6 is a sequence diagram showing the operation of the control apparatus 100 when receiving an explicit request to delete a temporary flow entry. Upon receiving a request to delete a temporary flow entry from a user of the network (step S350), the control apparatus 100 confirms whether or not the temporary flow entry requested to be deleted is registered in the control information management unit 120 (steps S351 and S352).

When the temporary flow entry requested to be deleted is registered, the control apparatus 100 instructs the switch 200 to delete the corresponding temporary flow entry (steps S353 and S354). Then, confirming that the switch 200 has deleted the temporary flow entry, the control apparatus 100 deletes the corresponding temporary flow entry from the control information management unit 120 and requests the standby control apparatus 100-2 to be synchronized via the synchronization unit 130 (steps S357 and S358). In this case, if the system is switched while the entry is being deleted, the temporary flow entry in the standby control apparatus 100-2 may not get deleted while the temporary flow entry on the switch 200 side has been deleted, but this can be restored by a Packet-in message on the switch 200 side where the temporary flow entry is deleted.

As described above, according to the present exemplary embodiment, the control information to be synchronized is divided into temporary flow entries and permanent flow entries, and the synchronization processing can be efficiently performed having entries reflected in the switches. More concretely, the setting time of the temporary flow entry in the switch 200 can be reduced. Further, the permanent flow entry is synchronized more preferentially than the temporary flow entry, and the temporary flow entry is set in the switch 200 without much delay since the process of synchronizing the temporary flow entry is completed without waiting for the completion of the synchronization.

Second Exemplary Embodiment

Next, a second exemplary embodiment in which verification processing during system switching can be efficiently performed by adding a function of adding a time stamp to the control information (flow entry) to the first exemplary embodiment will be described in detail with reference to the drawings.

In the case of the first exemplary embodiment, depending on the timing when system switching is performed, a difference may occur between the setting state of the control information (flow entry) actually set in the switch 200 and the setting state of the control information (flow entry) recognized by the active and standby control apparatuses 100 and 100-2.

Particularly, since the permanent flow entry demands strict synchronization, a process of matching the setting states of the control information (flow entry) in the two is required. At this time, if all the pieces of the control information (flow entry) set in the switch 200 and the control apparatuses 100 and 100-2 are targeted, the state matching processing will become heavy and it will take a fairly long time to complete it.

Therefore, in the present exemplary embodiment, a control information matching unit 140 is added to the control apparatus 100 of the first exemplary embodiment described above and the synchronization timing of the control information is changed. Since the second exemplary embodiment is configured identically to the first exemplary embodiment otherwise, the differences will be mainly described below.

Figure 7:
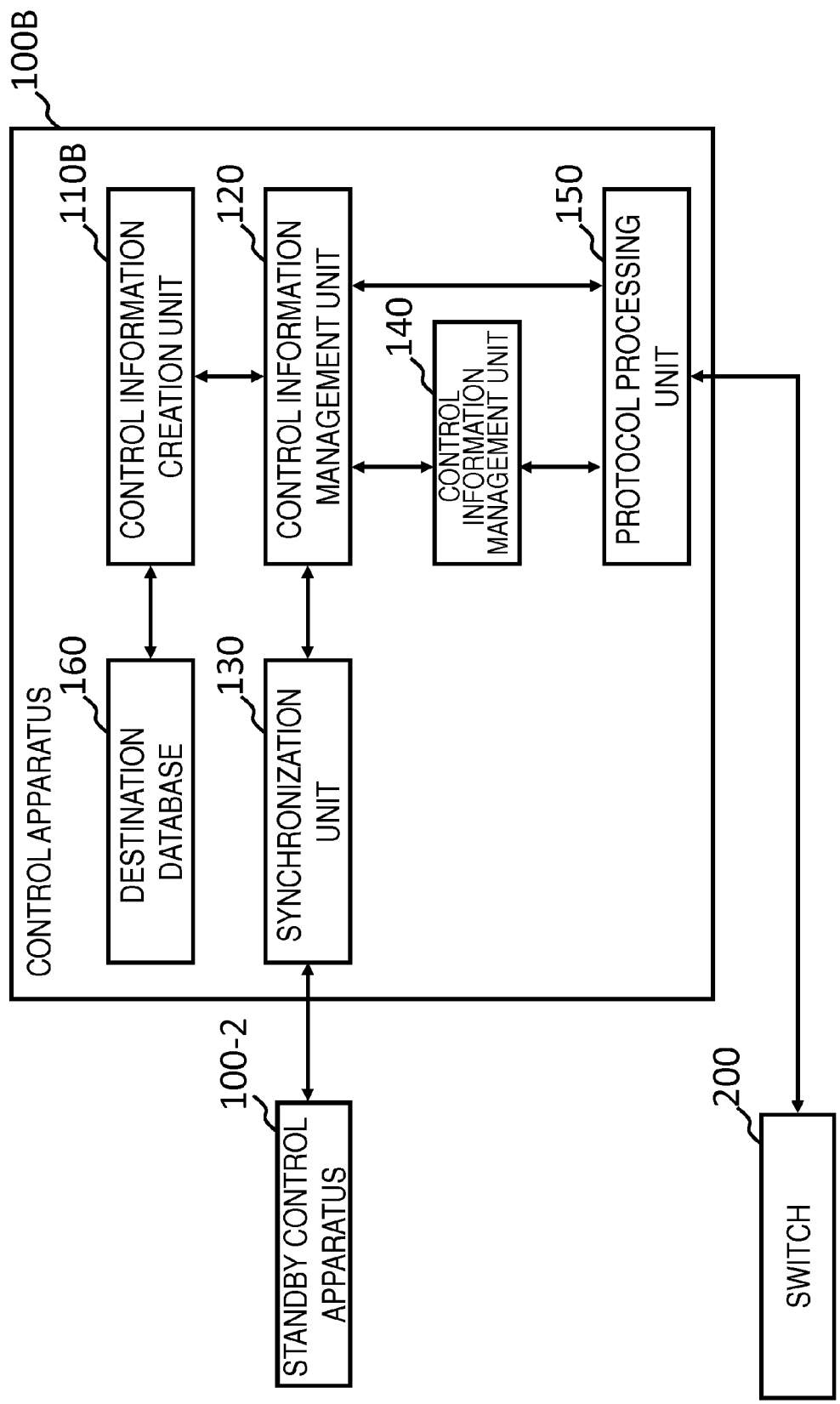
FIG. 7 is a drawing showing the configuration of a control apparatus of a second exemplary embodiment of the present invention.

FIG. 7 is a drawing showing the configuration of a control apparatus of the second exemplary embodiment of the present invention. In FIG. 7, the control apparatus 100B of the second exemplary embodiment of the present invention has a configuration in which a control information matching unit 140 is added to the control apparatus 100 of the first exemplary embodiment.

The control information matching unit 140 checks the setting state of the control information (flow entry) in the control apparatus 100-2, which newly become active, against that in the switch 200 after system switching. More concretely, the control information matching unit 140 acquires control information (flow entry) having a time stamp within a specified time range from both the control information management unit 120 and the switch 200, checks one against the other, and corrects the applicable control information (flow entry) if there is any difference.

Figure 8:
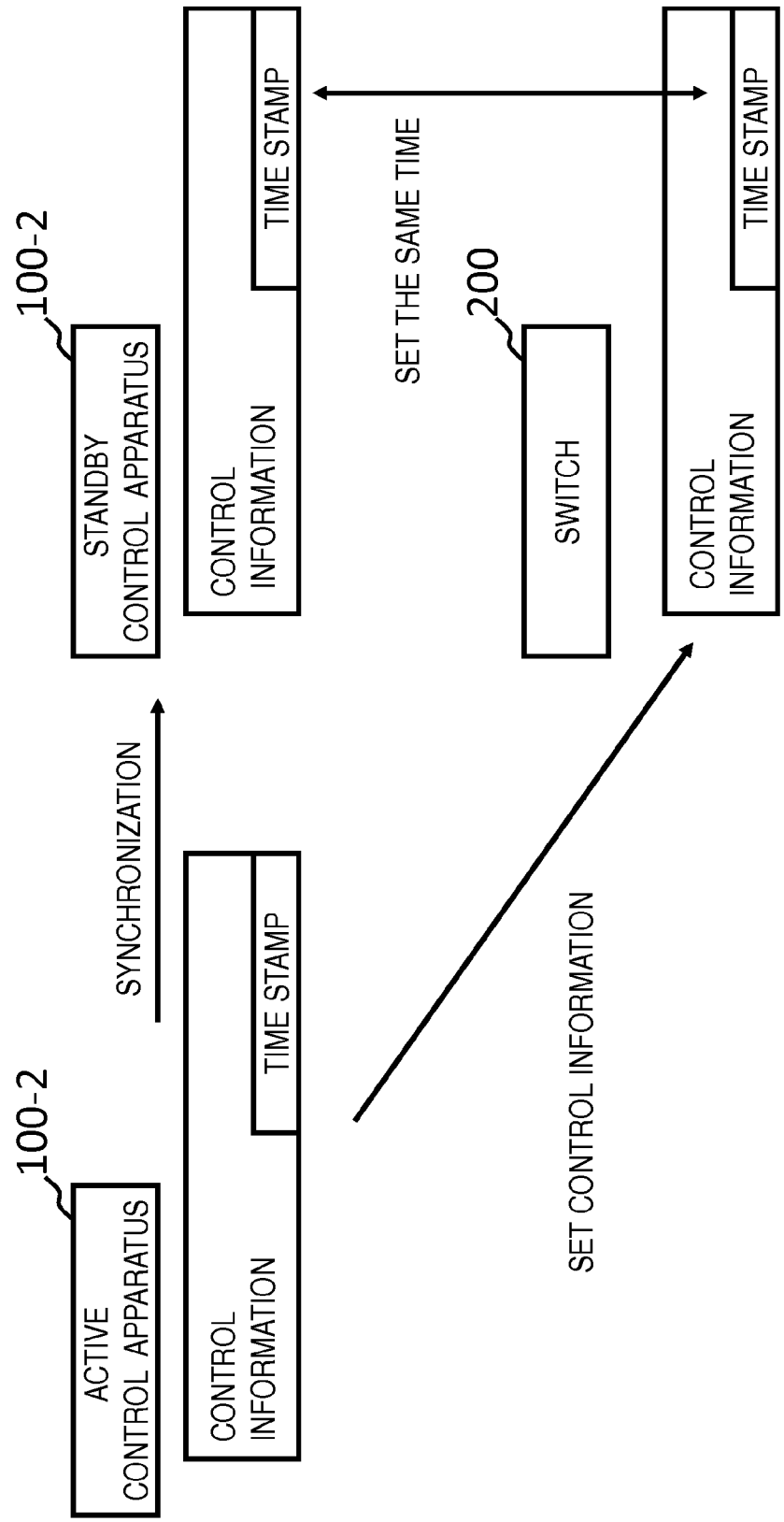
FIG. 8 is a drawing for explaining a time stamp added by the control apparatus of the second exemplary embodiment of the present invention.

In order to perform the state matching processing, when synchronizing the control apparatus 100B with the standby control apparatus 100-2 and when setting control information (flow entry) in the switch 200, a control information creation unit 110B of the present exemplary embodiment sets a time stamp indicating when the control information (flow entry) is created, as shown in FIG. 8. Further, in the present exemplary embodiment, lower bits of a cookie of control information (flow entry) are used as a region for storing the time stamp (refer to Table 1 in "5.2 Flow Table" in Non-Patent Literature 2). It goes without saying that another extension field can be provided to store the time stamp information.

Further, the processing procedure for deleting a permanent flow entry is changed in order to perform the state matching processing.

Figure 9:
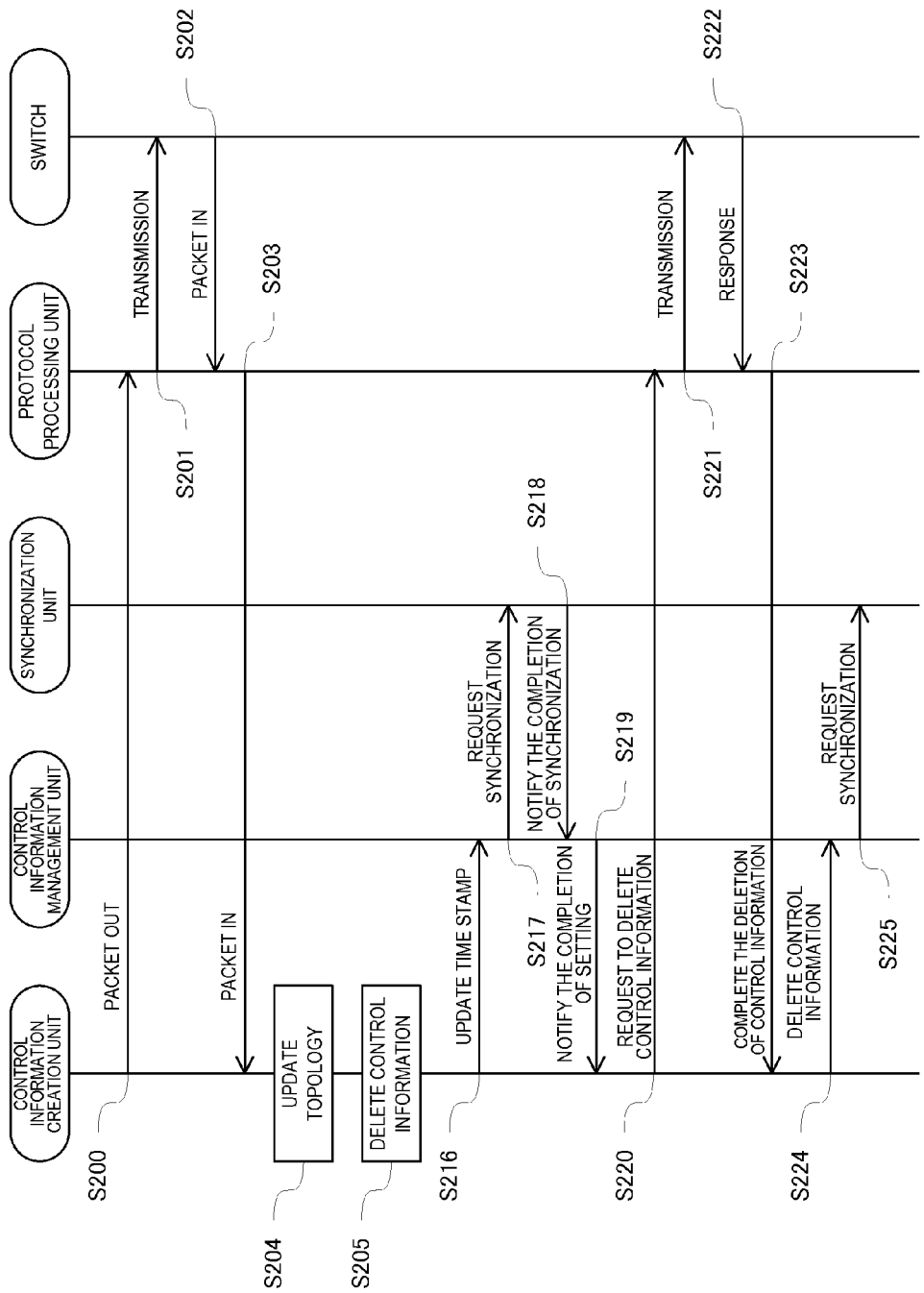
FIG. 9 is a sequence diagram showing an operation (when a switch is withdrawn) of the control apparatus of the second exemplary embodiment of the present invention.

FIG. 9 is a sequence diagram showing the operation of the control apparatus 100B of the second exemplary embodiment of the present invention when deleting a permanent flow entry. What differs from the procedure of the first exemplary embodiment shown in FIG. 4 is the operation after a topology change is detected (the step S204), and an unnecessary permanent flow entry is derived or how an existing permanent flow entry is rewritten is determined (the step S205).

In the first exemplary embodiment, an unnecessary permanent flow entry is simply deleted, but if the time stamp remains old, control information (flow entry) changed recently may be leaked at the time of state matching. Therefore, in the present exemplary embodiment, the time stamp is updated once (steps S216 to S219 in FIG. 9) before the permanent flow entry is actually deleted. Then, the control apparatus 100B instructs the switch 200 to delete the permanent flow entry (steps S220 to S223 in FIG. 9), waits for a response, and deletes it from the control information management unit 120 (steps S224 to S225 in FIG. 9).

Next, the state matching processing performed by the control apparatus 100B of the present exemplary embodiment will be described. In the first exemplary embodiment, when the control information (flow entry) is synchronized, the permanent flow entry and the temporary flow entry are processed separately, but the state matching processing of the present exemplary embodiment verifies them collectively without distinguishing the two.

The time stamp added at the time of setting as described is used by both the control information management unit 120 and the switch 200 as an extraction condition when the control information (flow entry) is acquired. Further, in the present exemplary embodiment, since the time stamp is stored in the lower bits of a cookie of the control information (flow entry) as described, control information (flow entry) to be acquired can be specified using the cookie filtering function defined in OpenFlow Switch Specification V1.1 and thereafter (refer to "Cookie Enhancements Proposal—cookie mask for filtering" in B.9.6 "Other changes" in Non-Patent Literature 2).

Figure 10:
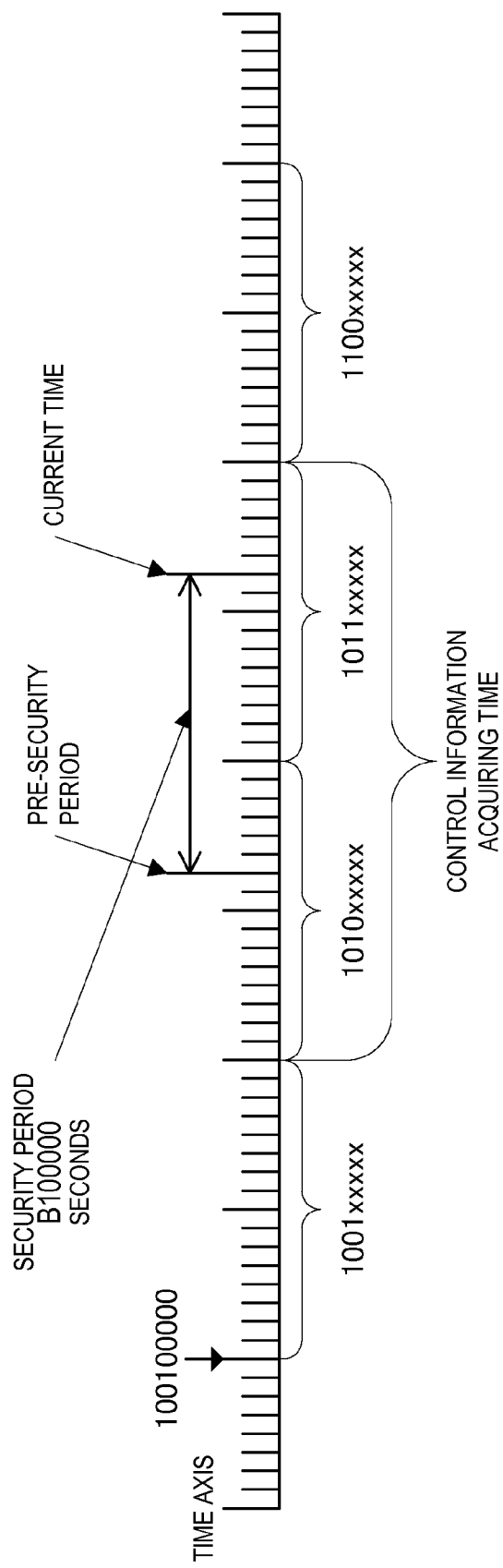
FIG. 10 is a drawing for explaining the range of processing for matching control information performed by the control apparatus of the second exemplary embodiment of the present invention.

Next, conditions for acquiring the control information (flow entry) used in the present exemplary embodiment will be described. FIG. 10 shows two points in time: a state matching start time (the current time) and a pre-security period time that is 100000 seconds (32 decimal seconds), predetermined as a security period, before the current time. Note that all the values in FIG. 10 are expressed in binary number. Here, how the control information (flow entry) is acquired with filtering conditions that covers the entire security period and the state matching processing is performed is discussed.

Figure 11:
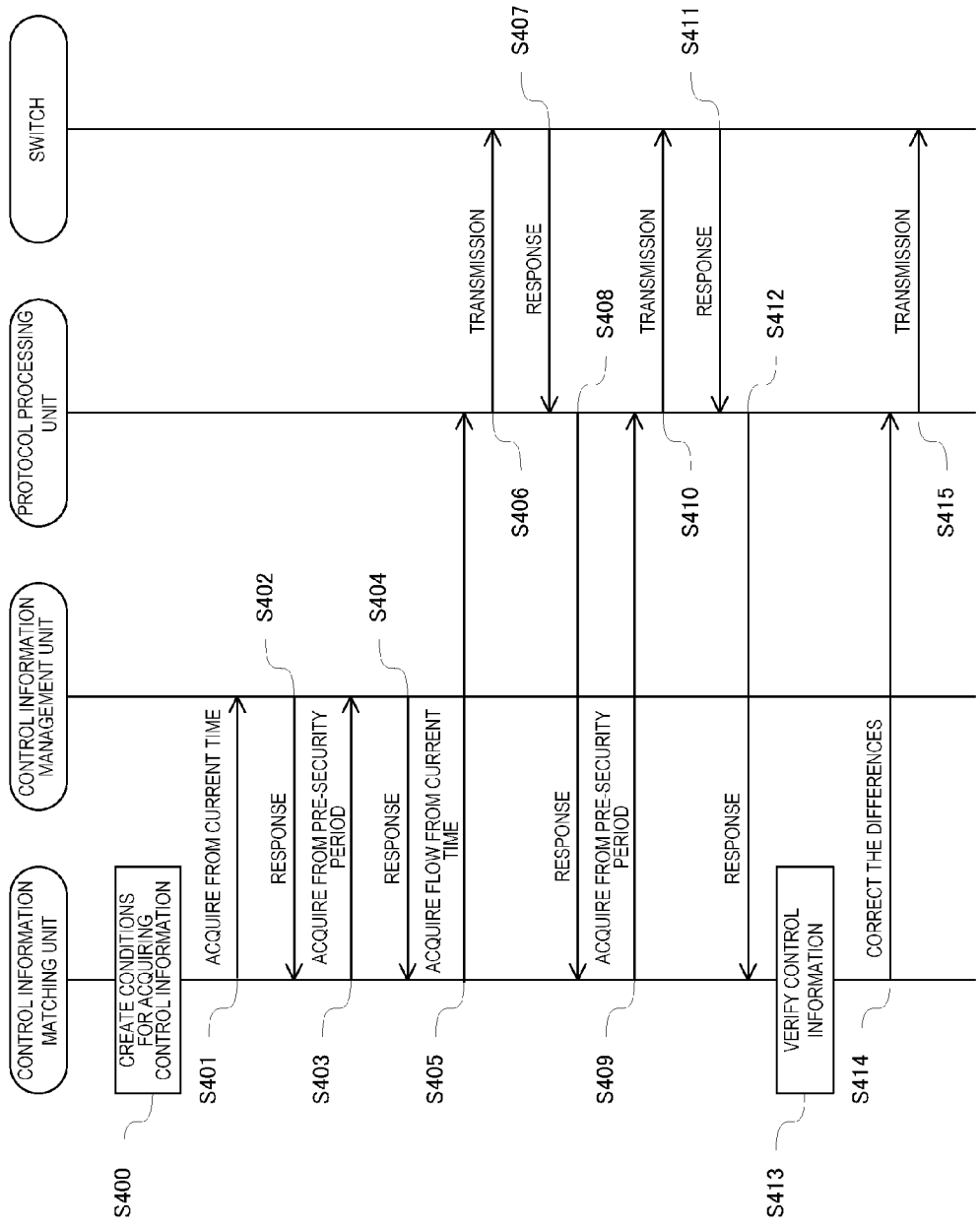
FIG. 11 is a sequence diagram showing an operation (the processing for matching control information) of the control apparatus of the second exemplary embodiment of the present invention.

FIG. 11 is a sequence diagram of the state matching processing triggered by system switching. First, the control apparatus 100B acquires a start time (the current time) and creates a first condition for acquiring control information (flow entry) (step S400). The first condition can be created by masking any length from upper bits of the time stamp according to the length of the security period (refer to "1011xxxxx" in FIG. 10). Further, since acquisition with only the first condition cannot cover the entire security period in FIG. 10, a second condition that covers from the current time to a time before the security period is created (refer to "1010xxxxx" in FIG. 10).

Next, the control apparatus 100B acquires control information (flow entry) having a time stamp within a specified range from the control information management unit 120 with the first and second conditions created (steps S401 to S404).

Similarly, the control apparatus 100B acquires control information (flow entry) from the switch 200 with the first and second conditions (S405 to S412).

Next, the control apparatus 100B verifies the control information (flow entry) and derives the differences (step S413). If any difference is found as a result of the verification, the control apparatus 100B creates a control message that corrects the difference and transmits the message to the switch 200. More concretely, if, as a result of the verification, control information (flow entry) that is set in the switch 200, but does not exist in the control information management unit 120 is found, the control apparatus 100B instructs the switch 200 to delete the corresponding control information (flow entry). On the other hand, if control information (flow entry) that exists in the control information management unit 120, but is not set in the switch 200 is found, the control apparatus 100B instructs the switch 200 to set the corresponding control information (flow entry). Further, when the control information (flow entry) set corresponds to each other, but there is a difference in action and the cookie value, the control apparatus 100B instructs the switch 200 to change the control information (flow entry) so that the contents will match (steps S414 to 415).

According to the second exemplary embodiment of the present invention with the added functions, state inconsistency that occurs at the time of system switching can be corrected in a short period of time, in addition to the effects of the first exemplary embodiment.

Further, it is assumed that the filtering function of a cookie is used in the second exemplary embodiment, but the example does not limit the region for storing the time stamp. Further, the verification can be performed with conditions for acquiring the control information (flow entry) that sets any period (start point or end point), as in the concept shown in FIG. 10.

The exemplary embodiments of the present invention have been described above, however, the present invention is not limited to the exemplary embodiments described and further modifications, substitutions, and adjustments can be added within the scope of the basic technological concept of the present invention. For instance, the configurations and the operation sequences of the control apparatuses used in the exemplary embodiments are merely examples.

For instance, in the first exemplary embodiment, the synchronization with the standby control apparatus 100-2 is performed after the switch has been instructed to set or delete a temporary flow entry, however, the order can be reversed since temporary flow entries do not have to be strictly synchronized as described above. Further, the control apparatus was described to wait for the notification that synchronization has been completed from the standby control apparatus 100-2 in the case of a permanent flow entry as well, but the setting of the switch 200 may be performed first (rollback processing that deletes the permanent flow entry set in the switch 200 will be necessary if the synchronization fails).

Further, in the first and second exemplary embodiments, the present invention is applied to the OpenFlow switch and the control apparatus thereof (the controller), however, the present invention can be applied to a centralized-control network having a similar flow type, or a network in which the state of control information set in switches must be matched.

Finally, preferred modes of the present invention will be summarized.

Mode 1

A control apparatus, comprising:
a synchronization unit that transmits control information set in a communication node to another control apparatus that operates in synchronization with the control apparatus and synchronizes with the another control apparatus; and
a control information creation unit that creates control information to be set in a communication node to be controlled, wherein
if the created control information is first control information set temporarily in accordance with a notification from the communication node to be controlled, the control apparatus sets the first control information in the communication node without waiting to synchronize with the another control apparatus, and
if control information to be set is second control information other than the first control information, the control apparatus sets the second control information in the communication node after synchronizing with the another control apparatus.

Mode 2

The control apparatus according to mode 1, wherein
the control apparatus synchronizes with the another control apparatus after setting the first control information in the communication node if the created control information is the first control information.

Mode 3

The control apparatus according to mode 1 or 2, wherein
the second control information is control information for configuring a packet forwarding path between preset communication nodes, and the first control information is control information for configuring a temporary path connected to a packet forwarding path generated by the second control information.

Mode 4

The control apparatus according to any one of modes 1 to 3, wherein
the control apparatus sets a validity period in the first control information.

Mode 5

The control apparatus according to any one of modes 1 to 4, wherein
the control apparatus adds a time stamp that indicates a setting time at least to the second control information.

Mode 6

The control apparatus according to mode 5, further comprising:
a control information matching unit that acquires the control information managed by the control apparatus and control information set in the communication node to be controlled using the time stamp, and performs a verification between the acquired control information.

Mode 7

The control apparatus according to mode 5 or 6, wherein
the control apparatus records the time stamp in a cookie field of control information.

Mode 8

A communication system, comprising:
the control apparatus according to the first aspect; and
a communication node that processes a received packet based on the set control information.

Mode 9

A synchronization method for a control apparatus that comprises: a synchronization unit that transmits control information set in a communication node to another control apparatus that operates in synchronization with the control apparatus and synchronizes with the another control apparatus; and a control information creation unit that creates control information to be set in a communication node to be controlled, the synchronization method comprising:
if the created control information is first control information set temporarily in accordance with a notification from the communication node to be controlled, setting the first control information in the communication node without waiting to synchronize with the another control apparatus; and
if control information to be set is second control information other than the first control information, setting the second control information in the communication node after synchronizing with the another control apparatus.

Mode 10

A program for a computer that comprises: a synchronization unit that transmits control information set in a communication node to another control apparatus that operates in synchronization with the control apparatus and synchronizes with the another control apparatus; and a control information creation unit that creates control information to be set in a communication node to be controlled, the program causing the computer to execute:
if the created control information is first control information set temporarily in accordance with a notification from the communication node to be controlled, setting the first control information in the communication node without waiting to synchronize with the another control apparatus; and
if control information to be set is second control information other than the first control information, setting the second control information in the communication node after synchronizing with the another control apparatus.

Further, modes 8 to 10 can be developed into modes 2 to 7 as mode 1.

Further, the disclosure of each Patent Literature and Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned. Particularly, the ranges of the numerical values used in the present description should be interpreted as a specific numeric value or small range included in the ranges even in cases where it is not stated so.

100, 100A, 100B, 100-2: control apparatus
110, 110A, 110B: control information creation unit
120: control information management unit
130, 130A: synchronization unit
140: control information matching unit
150: protocol processing unit
160: destination database
200: switch

What is claimed is:
1. A control apparatus, comprising:
a synchronization unit that transmits control information set in a communication node to another control apparatus that operates in synchronization with the control apparatus and synchronizes with the another control apparatus; and
a control information creation unit that creates control information to be set in a communication node to be controlled, wherein
if the created control information is first control information set temporarily in accordance with a notification from the communication node to be controlled, the control apparatus sets the first control information in the communication node without waiting to synchronize with the another control apparatus, and
if control information to be set is second control information other than the first control information, the control apparatus sets the second control information in the communication node after synchronizing with the another control apparatus.
2. The control apparatus according to claim 1, wherein the control apparatus synchronizes with the another control apparatus after setting the first control information in the communication node if the created control information is the first control information.

3. The control apparatus according to claim 1, wherein
the second control information is control information for configuring a packet forwarding path between preset communication nodes, and
the first control information is control information for configuring a temporary path connected to a packet forwarding path generated by the second control information.

4. The control apparatus according to claim 1, wherein the control apparatus sets a validity period in the first control information.

5. The control apparatus according to claim 1, wherein the control apparatus adds a time stamp that indicates a setting time at least to the second control information.

6. The control apparatus according to claim 5, further comprising:
a control information matching unit that acquires the control information managed by the control apparatus and control information set in the communication node to be controlled using the time stamp, and performs a verification between the acquired control information.

7. The control apparatus according to claim 5, wherein the control apparatus records the time stamp in a cookie field of control information.

8. A communication system, comprising:
the control apparatus according to claim 1; and
a communication node that processes a received packet based on the set control information.

9. A synchronization method, comprising:
by a control apparatus, transmitting control information set in a communication node to another control apparatus that operates in synchronization with the control apparatus and synchronizing with the another control apparatus;
creating control information to be set in a communication node to be controlled;
if the created control information is first control information set temporarily in accordance with a notification from the communication node to be controlled, setting the first control information in the communication node without waiting to synchronize with the another control apparatus; and
if control information to be set is second control information other than the first control information, setting the second control information in the communication node after synchronizing with the another control apparatus.

10. The synchronization method according to claim 9, comprising:
synchronizing with the another control apparatus after setting the first control information in the communication node if the created control information is the first control information.

11. The synchronization method according to claim 9, wherein
the second control information is control information for configuring a packet forwarding path between preset communication nodes, and
the first control information is control information for configuring a temporary path connected to a packet forwarding path generated by the second control information.

12. The synchronization method according to claim 9, wherein
the control apparatus sets a validity period in the first control information.

13. The synchronization method according to claim 9, wherein
the control apparatus adds a time stamp that indicates a setting time at least to the second control information.

14. A non-transitory computer-readable recording medium, storing a program that causes a computer provided in a control apparatus to execute:
transmitting control information set in a communication node to another control apparatus that operates in synchronization with the control apparatus and synchronizing with the another control apparatus;
creating control information to be set in a communication node to be controlled;
if the created control information is first control information set temporarily in accordance with a notification from the communication node to be controlled, setting the first control information in the communication node without waiting to synchronize with the another control apparatus; and
if control information to be set is second control information other than the first control information, setting the second control information in the communication node after synchronizing with the another control apparatus.

15. The non-transitory computer-readable recording medium according to claim 14, wherein
the program causes the computer to execute:
synchronizing with the another control apparatus after setting the first control information in the communication node if the created control information is the first control information.

16. The non-transitory computer-readable recording medium according to claim 14, wherein
the second control information is control information for configuring a packet forwarding path between preset communication nodes, and
the first control information is control information for configuring a temporary path connected to a packet forwarding path generated by the second control information.

17. The non-transitory computer-readable recording medium according to claim 14, wherein
the program causes the computer to execute:
setting a validity period in the first control information.

18. The non-transitory computer-readable recording medium according to claim 14, wherein
the program causes the computer to execute:
adding a time stamp that indicates a setting time at least to the second control information.

* * * * *